Jan. 17, 1950  E. B. ROYLE  2,495,138
MATERIAL HANDLING MACHINE
Filed July 25, 1946  5 Sheets-Sheet 1

Inventor:
Edwin B. Royle
By Stowell & Evans
Attorneys.

Jan. 17, 1950     E. B. ROYLE     2,495,138
MATERIAL HANDLING MACHINE

Filed July 25, 1946     5 Sheets-Sheet 2

Inventor:
Edwin B. Royle
Stowell & Evans
Attorneys.

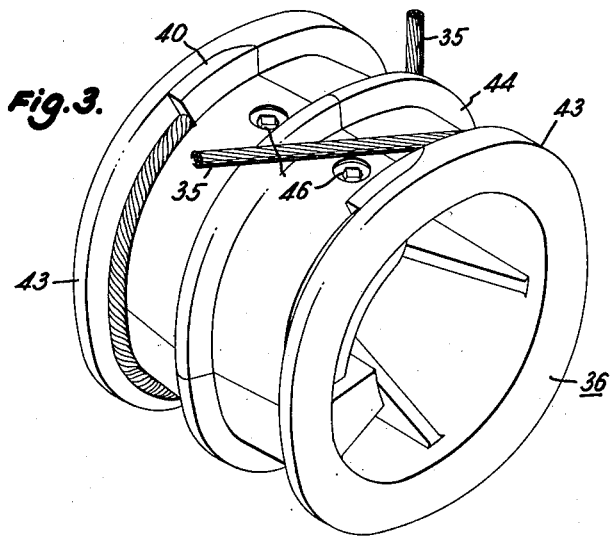
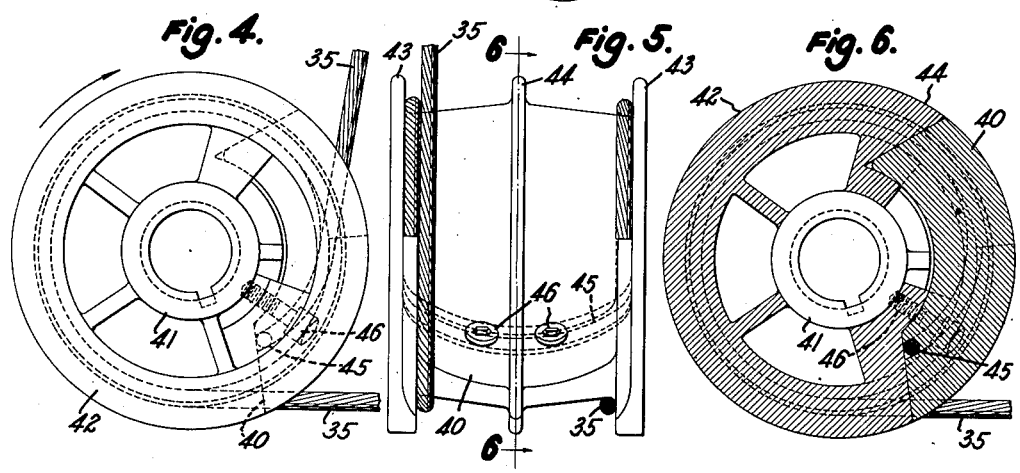
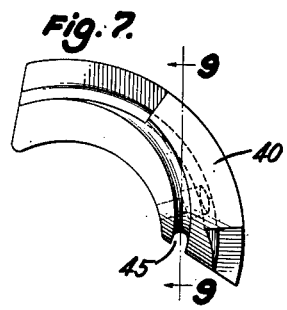
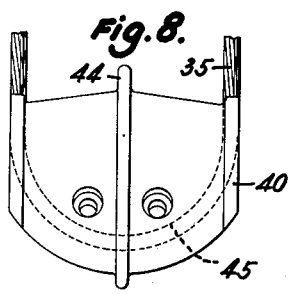
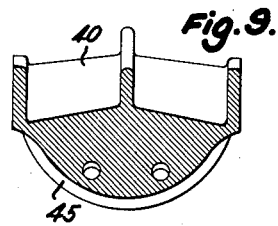

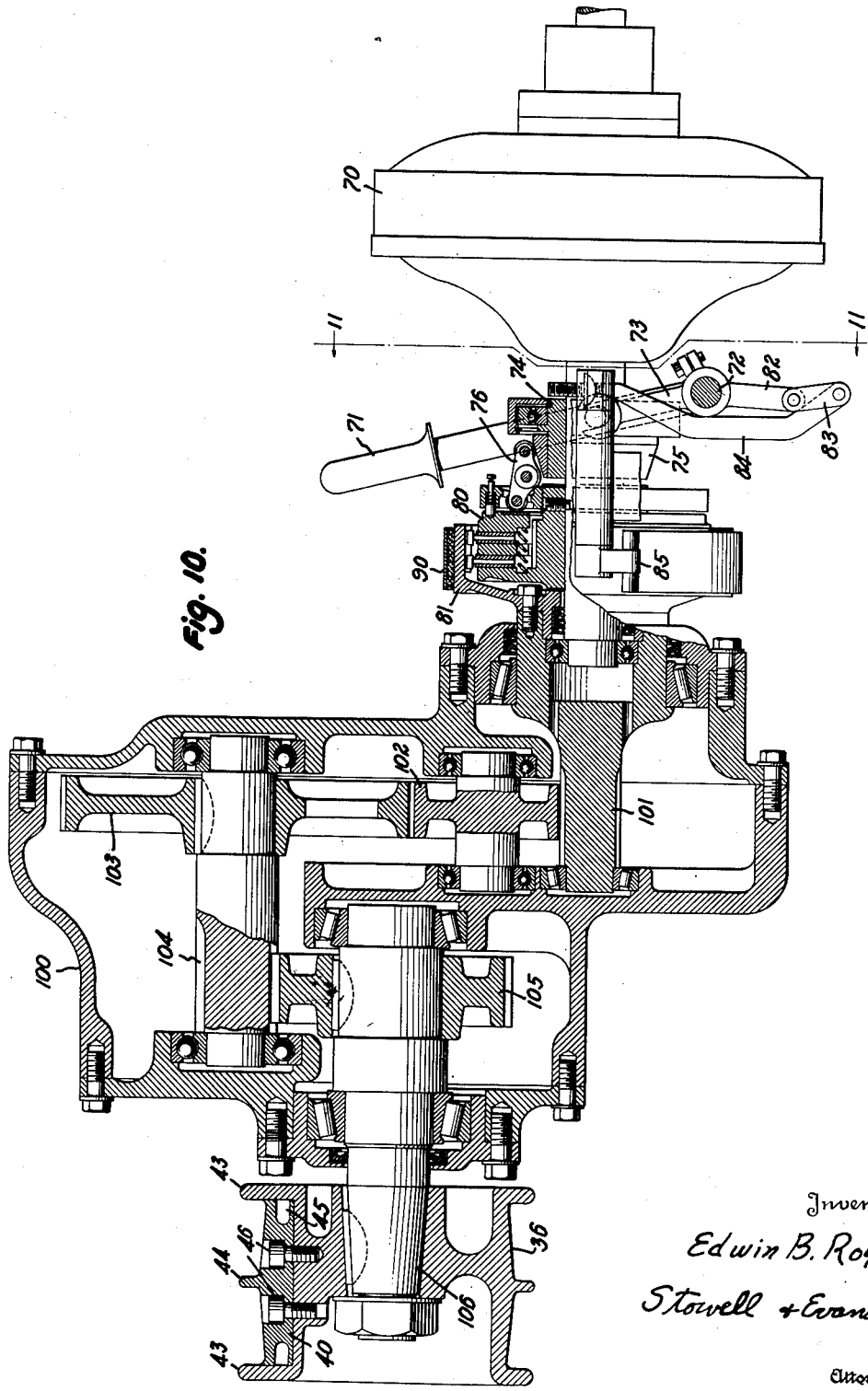

Jan. 17, 1950     E. B. ROYLE     2,495,138
MATERIAL HANDLING MACHINE
Filed July 25, 1946     5 Sheets-Sheet 5
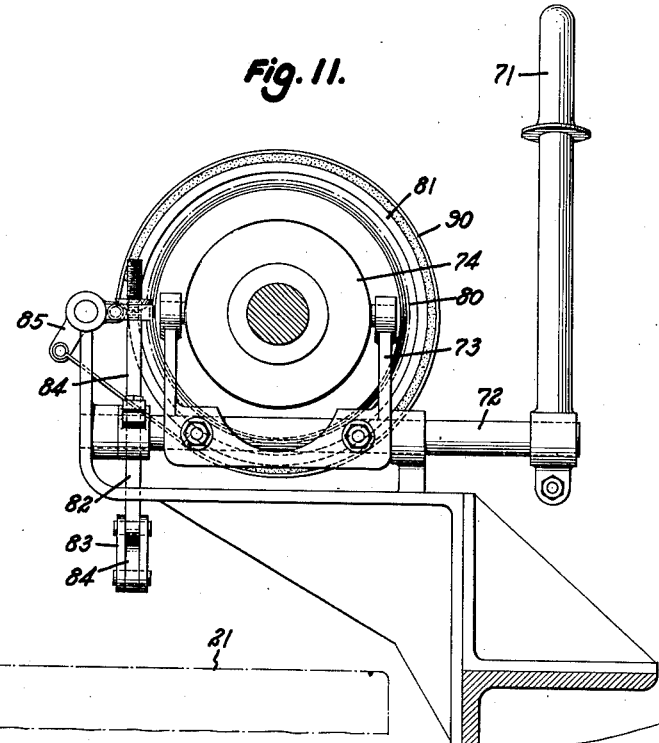
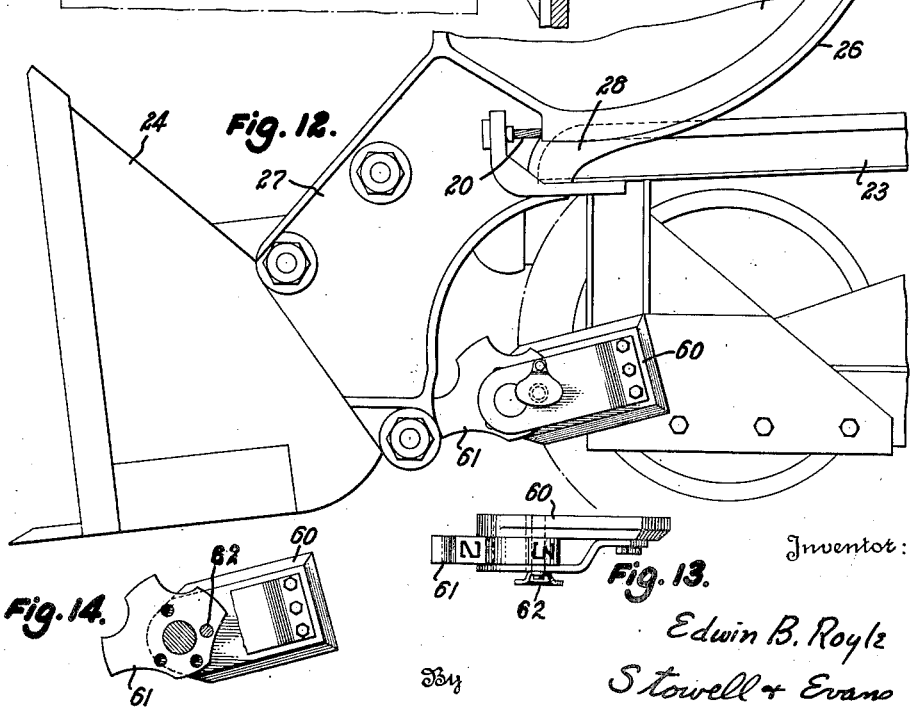
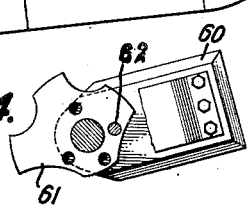
Inventor:
Edwin B. Royle
By Stowell & Evans
Attorneys.

Patented Jan. 17, 1950

2,495,138

UNITED STATES PATENT OFFICE 2,495,138

MATERIAL HANDLING MACHINE

Edwin B. Royle, Salt Lake City, Utah, assignor to The Eimco Corporation, Salt Lake City, Utah, a corporation of Utah Application July 25, 1946, Serial No. 686,130

7 Claims. (Cl. 214—148)

This invention relates to machines for handling bulk materials and particularly to tractor-mounted material handling machines adapted expeditiously and economically to load and otherwise handle bulk materials under a wide variety of conditions.

The machine of the invention provides a rugged self-propelled device adapted to gather material at the front end thereof, and to lift the gathered material to a dumping position at the rear end thereof at which position the gathering member is at its maximum height, while maintaining substantial stability of the machine in all positions of the gathering, lifting and dumping element so that the machine may safely be moved or adjusted in position during the gathering or lifting operations. The construction of the invention eliminates all overhanging and projecting parts at the dumping position except the material carrying member itself so that the rear or dumping end of the machine may be placed in close proximity to the receptacle or transport vehicle into which the material is to be placed.

An object of the invention is the provision of a tractor-mounted material handling machine.

Another object of the invention is the provision of a machine for loading material into transport carriers under a wide variety of conditions.

A further object of the invention is the provision of a material handling machine embodying improved devices for lifting, transporting and loading bulk materials in substantial capacities.

Other objects and advantages of the invention will be apparent from the following description of a preferred embodiment of the invention with particular reference to the accompanying drawings in which:

Fig. 3 is a perspective view of the wedge cable drum of the invention;

Fig. 4 is a side elevation, Fig. 5 is a front elevation, and Fig. 6 is a section on line 6—6 of Fig. 5, of the cable drum of Fig. 3;

Fig. 7 is a side elevation, Fig. 8 is a front elevation, and Fig. 9 is a section on line 9—9 of Fig. 7, of the wedge member of the cable drum of Fig. 3;

Fig. 10 is a side elevation in partial section of the transmission and control assembly of the shovel lifting mechanism of the machine of Fig. 1;

Fig. 11 is a transverse section on line 11—11 of Fig. 10 showing the control device;

Fig. 12 is a fragmentary side elevation of the shovel and cooperating support and thrust stop devices of the machine of Fig. 1;

Fig. 13 is a top view and Fig. 14 is a side elevation of the thrust stop device of Fig. 12;

Fig. 15 is a longitudinal section of the shovel buffer device of the machine of Fig. 1.

Figure 1:
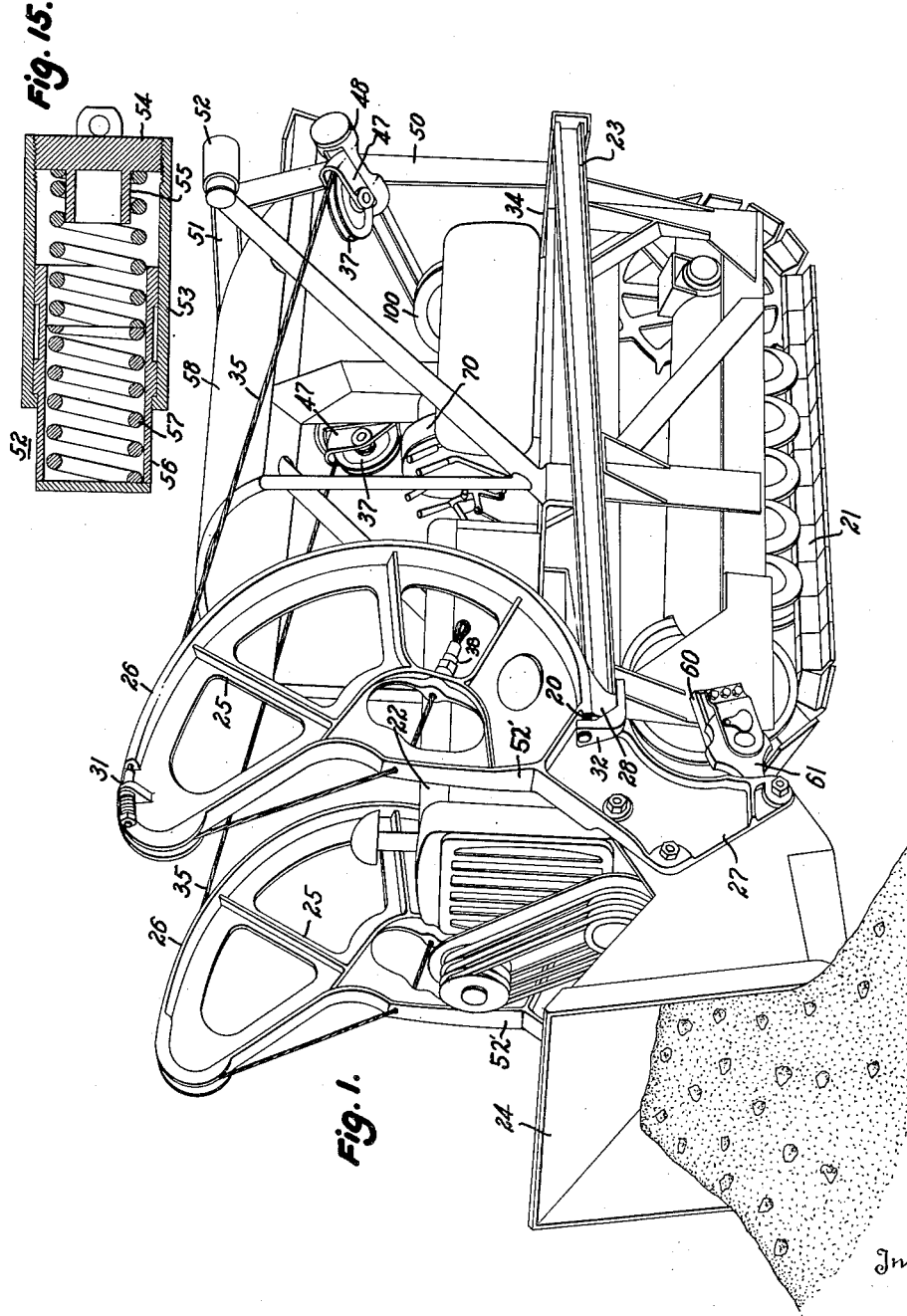
Fig. 1 is a perspective view of a tractor-mounted material handling machine embodying the principles of the invention, showing the front (shovelling) end and left side of the machine.
Figure 2:
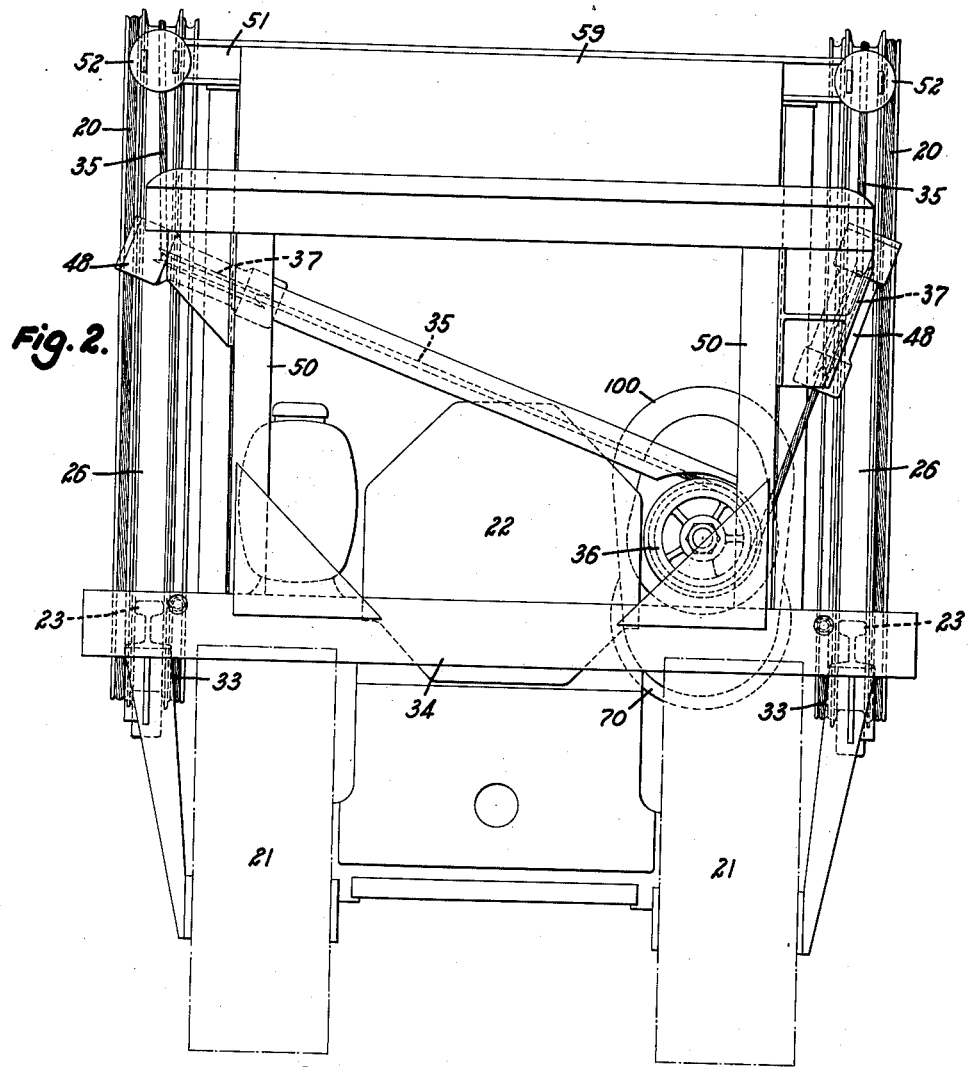
Fig. 2 is an elevation of the rear (loading) end of the machine of Fig. 1.

Referring particularly to Figs. 1 and 2, the machine comprises a conventional tractor including track-laying running gear 21, and a suitable power source, such as a Diesel engine indicated at 22. Mounted on each side of the tractor on appropriate support is a rail 23. The rails 23 may be horizontal or approximately so, but preferably slant perceptibly downward toward the front or shovelling end of the machine, as shown in the figures.

The material gathering and lifting bucket 24 is carried by a pair of rocker members 25 comprising a rocker portion having a contact groove 26 adapted to fit over the upper edge of rails 23 and curved on a radius of curvature increasing in the direction away from the arm portion 27 to which the bucket 24 is attached.

Adjacent the arm portion 27 the groove 26 is curved sharply downward to form a socket 28 adapted to fit over the shoulder provided by the forward end of rails 23 as shown more particularly in Fig. 12.

Lying in grooves positioned to each side of contact groove 26 are guide cables. Cables 20 lie in the outer grooves when the rocker assembly is in shovelling position, as shown in Figs. 1 and 2, and are attached at one end to lugs 31 at the rearward ends of the rocker units and at the other end to lugs 32 adjacent the forward ends of the rails 23. Cables 33 lie in the inner grooves when the rocker assembly is in dumping position, and are attached at one end to frame 34 adjacent the rearward ends of rails 23 and at the other end to lugs (not shown) adjacent the forward ends of the rocker units.

The rocker unit is actuated by drive cable 35. The middle portion of drive cable 35 is reeved through cable drum 36 (Figs. 3–10); the end portions pass through swivelled sheaves 37 (Fig. 16), over the sharply curved rearward ends of groove 26 on the rocker units and are attached to each rocker unit at anchors 38.

The drive cable 35 actuating the rocker assembly is driven by power take-off 39 through the control and transmission assembly, shown in detail in Fig. 10, by which the cable drum 36 is driven and controlled.

The cable drum 36, shown in detail in Figs. 3-9, effectively balances the tension between the two ends of the drive cable 35, by providing means for slippage of the cable to a position of equalized tension as power is applied to the drum.

The drum comprises a wedge member 40 and a body member, consisting of a hub 41 adapted to be keyed to a drive shaft and a rim 42 recessed to accommodate wedge member 40. The rim portion of the body member is provided with upstanding lateral ridges 43 at each side of the drum face, and the rim and wedge member are provided with cooperating upstanding ridge elements which provide a ridge 44 centrally of the drum face. A cable groove 45 is provided around the toe along each of the sides of the wedge member passing out to the face of the drum adjacent the lateral ridges 43. In assembling the drum and cable, the middle portion of the cable is laid in groove 45 of the wedge member, the wedge member is placed in the recess in the body member and is bolted to the body member by bolts 46. Each end of the cable is then passed once around the drum face, through the corresponding swivelled sheaves 37 and attached to the corresponding rocker unit in the shovelling position of the rocker assembly as shown in Fig. 1.

Figure 16:
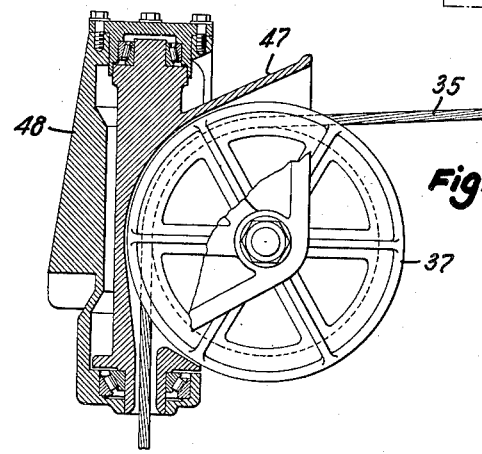
Fig. 16 is an elevation in partial section of a pivotally mounted cable sheave of the machine of Fig. 1.

The sheaves 37, shown in detail in Fig. 16, are journalled in swivel yokes 47 which are pivotally mounted in brackets 48 attached to vertical members 50 of the tractor superstructure.

Mounted on the outer ends of the top rear vertical member 51 of the tractor superstructure are spring buffers 52 (Fig. 15) which engage the rocker units at faces 52' in the dumping position of the rocker assembly. An advantageous buffer construction, as shown in Fig. 15, comprises a cylinder 53 threaded on to a rear piston plate 54 bearing on its interior face a stub post 55, a hollow piston 56 slidably mounted in the cylinder, and a coil spring 57 positioned between the piston and the cylinder.

The tractor superstructure carries a canopy 58 and rear curtain 59 to provide protection for the operator's position adjacent the traction and bucket lift controls.

A pair of adjustable thrust stop devices (Figs. 12-14) is mounted on the forward end of the tractor just outside of each lateral running gear. It comprises a bracket yoke 60 and a thrust stop member 61 mounted for rotation between the arms of the yoke. The stop member 61 carries a plurality of arms radially projecting varying distances from the axis of rotation to provide at selected positions of the stop member, advantageously indicated by indicia suitably marked on the stop member, thrust stop faces engaging the rocker arm units at a series of differing shovelling positions. Pin 62 passes through suitably positioned holes in the bracket yoke 60 and stop member 61 to retain the stop member in the selected position.

The adjustable thrust stop cooperates with the previously described socket 28 to provide a solid four-point thrust support for the rocker-bucket assembly in material digging and gathering operations at a plurality of selectable bucket lip levels and angles of attack.

The transmission and control assembly, shown in detail in Figs. 10 and 11, comprises a conventional hydraulic coupling 70, clutch 80, brake 90, and reduction gear 100.

A single control lever 71 controls both the clutch and the bucket brake. Movement of the control lever forward (to the left in Fig. 10) rotates shaft 72 counter-clockwise and rocks yoke 73 to the left. Sleeve 74 carrying cone 75 is thereby forced to the left actuating levers 76 to effect engagement of the clutch, thereby driving drum 81 and actuating gear train 100 through pinion 101, gears 102, 103, pinion 104, gear 105 and shaft 106. The bucket lift cable drum 36 described above is mounted on the shaft 106.

Movement of the control lever rearward (to the right in Fig. 10) beyond the point at which the clutch 80 is disengaged actuates brake 90 into engagement with the outer face of drum 81, through lever 82, link 83, tie rod 84, and angle lever 85 to the two ends of which the ends of the brake band are attached.

In operation, the bucket 24 is lowered to digging position with sockets 28 in contact with the forward ends of rails 23 and with the rear of the arm portions of the rockers in contact with the selected stop arm of the thrust stop 61. The bucket is then crowded into the material to be gathered by manipulation of the driving controls of the machine. It will be seen that with the solid four-point support of the bucket-rocker assembly and the adjustability of the digging angle, it is possible to loosen and gather into the bucket materials of all kinds including consolidated soils, caked materials and the like. When a load of material has been gathered into the bucket the clutch in the bucket-lifting assembly line is engaged and the bucket is elevated to dump position. During the elevating operation, the machine may, if necessary, be manipulated into any desired position adjacent a material bin, transport vehicle or the like. The provision of the spring buffers 52 makes it feasible to bring the rocker-bucket assembly up to dumping position over the back end of the machine with considerable force so that even wet or sticky materials are readily dropped out of the bucket.

The driving cable drum of the invention effectively equalizes the tension of the two ends of the driving cable at the beginning of each lifting operation, thus insuring equal draft on both sides of the rocker-bucket assembly and eliminating breaking of the cable.

The movement of the bucket both in lifting and dropping is under constant complete control of the operator through the single lever clutch and brake control, leaving one of the operator's hands always free to manipulate the traction controls of the machine.

I claim:

1. In a material handling machine including an automotive vehicle and a power-actuated material-gathering receptable carried by said vehicle, means for transferring said receptacle from a depressed material-gathering position at one end of the vehicle to an elevated material-dumping position at the other end of the vehicle comprising rail members extending along each side of the vehicle, and paired rocker members each having an extended curved surface adapted to roll along the top face of one of said rail members, means connecting said receptacle to said rocker members adjacent one end of the extended curved surfaces thereof, power-actuated means for constraining said rocker members to roll along said rails on said extended curved surfaces from the end adjacent said receptacle to the opposite end thereof whereby to raise the receptacle into elevated dumping position, and a pair of stop members carried by said vehicle at the material-gathering end thereof substantially below the level of said rails positioned to abut against the rocker-receptacle assembly in the depressed material-gathering position thereof, said stop members including a plurality of arms and being mounted for rotation eccentrically with respect to said arms to provide a plurality of preselectable stop positions.

2. In a material handling machine including an automotive vehicle and a power-actuated material-gathering receptacle caried by said vehicle, means for transferring said receptacle from a depressed material-gathering position at one end of the vehicle to an elevated material-dumping position at the other end of the vehicle comprising rail members extending along each side of the vehicle, and paired rocker members each having an extended curved surface adapted to roll along the top face of one of said rail members, projecting flange elements being positioned adjacent said extended curved surface to provide grooves adapted to receive the upper portions of said rail members, means connecting said receptacle to said rocker members adjacent one end of the extended curved surfaces thereof, and power-actuated means for constraining said rocker members to roll along said rails on said extended curved surfaces from the end adjacent said receptacle to the opposite end thereof whereby to raise the receptacle into elevated dumping position.

3. In a material handling machine including an automotive vehicle and a power-actuated material-gathering receptacle carried by said vehicle, means for transferring said receptacle from a depressed material-gathering position at one end of the vehicle to an elevated material-dumping position at the other end of the vehicle comprising rail members extending along each side of the vehicle, and paired rocker members each having an extended curved surface adapted to roll along the top face of one of said rail members, projecting flange elements being positioned adjacent said extended curved surface to provide grooves adapted to receive the upper portions of said rail members, means connecting said receptacle to said rocker members adjacent one end of the extended curved surfaces thereof, the radius of curvature of said extended curved surfaces increasing in the direction away from said receptacle, and power-actuated means for constraining said rocker members to roll along said rails on said extended curved surfaces from the end adjacent said receptacle to the opposite end thereof whereby to raise the receptacle into elevated dumping position.

4. In a material handling machine including an automotive vehicle and a power-actuated material-gathering receptacle carried by said vehicle, means for transferring said receptacle from a depressed material-gathering position at one end of the vehicle to an elevated material-dumping position at the other end of the vehicle comprising rail members extending along each side of the vehicle, and paired rocker members each having an extended curved surface adapted to roll along the top face of one of said rail members, projecting flange elements being positioned adjacent said extended curved surface to provide grooves adapted to receive the upper portions of said rail members, means connecting said receptacle to said rocker members adjacent one end of the extended curved surfaces thereof, said rails sloping substantially upward from the material-gathering end of the vehicle to the material-dumping end thereof, and power-actuated means for constraining said rocker members to roll along said rails on said extended curved surfaces from the end adjacent said receptacle to the opposite end thereof whereby to raise the receptacle into elevated dumping position.

5. In a material handling machine including an automotive vehicle and a power-actuated material-gathering receptacle carried by said vehicle, means for transferring said receptacle from a depressed material-gathering position at one end of the vehicle to an elevated material-dumping position at the other end of the vehicle comprising rail members extending along each side of the vehicle, and paired rocker members each having an extended curved surface adapted to roll along the top face of one of said rail members, means connecting said receptacle to said rocker members adjacent one end of the extended curved surfaces thereof, and power-actuated means for constraining said rocker members to roll along said rails on said extended curved surfaces from the end adjacent said receptacle. to the opposite end thereof whereby to raise the receptacle into elevated dumping position, said power-actuated means including a cable attached adjacent to the ends thereof to said rocker members, a driving drum having a recess in the drum surface and a wedge member removably secured in said recess, the outer surface of said wedge member conforming to the drum surface, said wedge member having an arcuate channel below the drum surface, opening into the drum surface and slidably engaging a loop of said cable intermediate the ends thereof whereby said drum exerts substantial traction on said cable only when the two ends of the cable are under substantially equal tension.

6. In a material handling machine including an automotive vehicle and a power-actuated material-gathering receptacle carried by said vehicle, means for transferring said receptacle from a depressed material-gathering position at one end of the vehicle to an elevated material-dumping position at the other end of the vehicle comprising rail members extending along each side of the vehicle, and paired rocker members each having an extended curved surface adapted to roll along the top face of one of said rail members, means connecting said receptacle to said rocker members adjacent one end of the extended curved surfaces thereof, power-actuated means for constraining said rocker members to roll along said rails on said extended curved surfaces from the end adjacent said receptacle to the opposite end thereof whereby to raise the receptacle into elevated dumping position, the curved surfaces of said rocker members being turned sharply down at the ends thereof adjacent to said receptacle to engage the ends of said rails in the material-gathering position of the rocker-receptacle assembly, and a pair of stop members carried by said vehicle at the material-gathering end thereof substantially below the level of said rails positioned to abut against the rocker-receptacle assembly in the depressed material-gathering position thereof, said stop members including a plurality of arms and being mounted for rotation eccentrically with respect to said arms to provide a plurality of preselectable stop positions.

7. In a material handling machine including an automotive vehicle and a power-actuated material-gathering receptacle carried by said vehicle, means for transferring said receptacle from a depressed material-gathering position at one end of the vehicle to an elevated material-dumping position at the other end of the vehicle comprising rail members extending along each side of the vehicle, and paired rocker members each having an extended curved surface adapted to roll along the top face of one of said rail members, means connecting said receptacle to said rocker members adjacent one end of the extended curved surfaces thereof, power-actuated means for constraining said rocker members to roll along said rails on said extended curved surfaces from the end adjacent said receptacle to the opposite end thereof whereby to raise the receptacle into elevated dumping position, a pair of stop members carried by said vehicle at the material-gathering end thereof substantially below the level of said rails positioned to abut against the rocker-receptacle assembly in the depressed material-gathering position thereof, said stop members including a plurality of arms and being mounted for rotation eccentrically with respect to said arms to provide a plurality of preselectable stop positions, and means for locking said stop members in said plurality of preselectable positions.

EDWIN B. ROYLE.

REFERENCES CITED

The following references are of record in the file of this patent:

UNITED STATES PATENTS

| Number | Name | Date |
| --- | --- | --- |
| 764,600 | King | July 12, 1904 |
| 1,527,995 | Parks | Mar. 3, 1925 |
| 1,536,383 | French | May 5, 1925 |
| 1,906,001 | Finlay et al. | Apr. 25, 1933 |
| 2,051,735 | Michelson | Aug. 18, 1936 |
| 2,201,671 | Osgood | May 21, 1940 |
| 2,205,732 | Royle | June 25, 1940 |
| 2,391,857 | Arps et al. | Jan. 1, 1946 |
| 2,398,859 | Ruddock | Apr. 23, 1946 |
| 2,417,544 | Coleman | Mar. 18, 1947 |